May 22, 1934.   J. L. JAMESON   1,960,155
MECHANICAL MEANS FOR MIXING LUBRICANT WITH
THE FUEL OF SUPERCHARGED ENGINES
Filed June 16, 1933
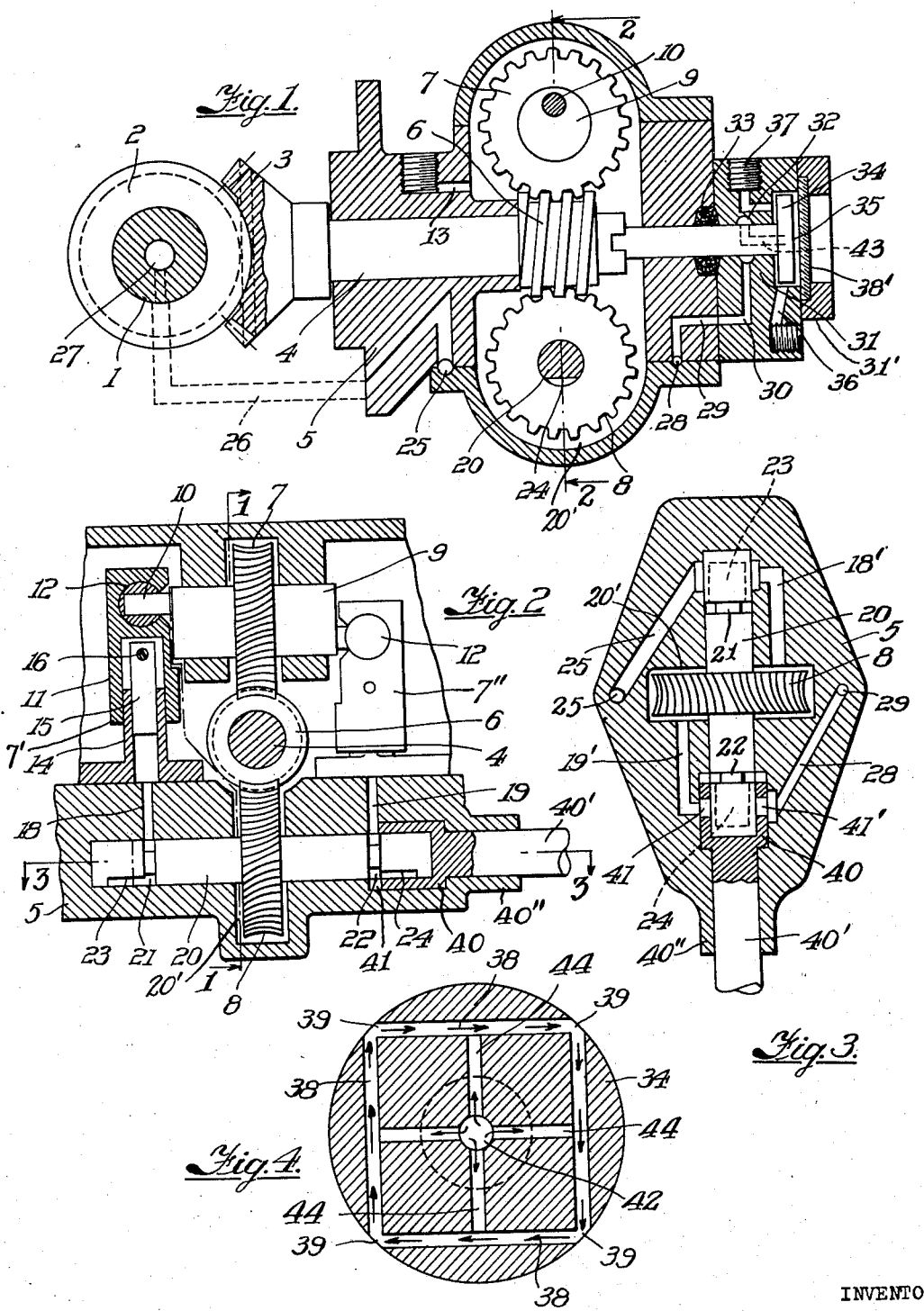
INVENTOR
Joseph L. Jameson
By
ATTORNEY Patented May 22, 1934

1,960,155

UNITED STATES PATENT OFFICE 1,960,155

MECHANICAL MEANS FOR MIXING LUBRICANT WITH THE FUEL OF SUPERCHARGED ENGINES

Joseph Lambert Jameson, Cheam, England

Application June 16, 1933, Serial No. 676,187
In Great Britain June 7, 1932

10 Claims. (Cl. 123—196)

This invention relates to supercharged internal combustion engines and has for its object the provision of an improved mechanically driven unit for the purpose of supplying a mixture of lubricant and liquid fuel to the carburettor of a two or four stroke engine.

According to the invention, an apparatus is provided for forming a mixture of fuel and lubricant to be supplied to an internal combustion engine, said apparatus comprising a pumping device by which lubricant is supplied from one source and a mechanically operated stirring or mixing device to receive lubricant from said pumping device and liquid fuel from another source.

The invention also comprises a pumping device or devices for supplying lubricant to a supercharger and/or other mechanism and to the mixing device which, together with said pump or pumps, is driven from a common power source, and which is adapted to supply the mixture of fuel and lubricant to a carburettor.

The invention further comprises a pair of oil pumps and a rotary mixing device adapted to be driven from a supercharger, connections between one of said pumps and said supercharger and/or other mechanism, connections between the other of said pumps and said mixing device and means for supplying liquid fuel to said mixing device.

According to the preferred form of the invention, the mixing device comprises a rotary disc having radial passages connected at their outer ends by passages at right angles to said radial passages and communicating with ports, lubricant being supplied to the central intersection of said radial passages and liquid fuel being supplied to a chamber in which said disc rotates.

Reference will now be made to the accompanying drawing which illustrates by way of example, a construction according to the invention, and in which:—

Figure 1 is a longitudinal sectional view of the apparatus on the line 1—1 of Figure 2;

Figure 2 is a transverse sectional view on the line 2—2 of Figure 1;

Figure 3 is a sectional view taken on the line 3—3 of Figure 2; and

Figure 4 is a vertical sectional view, on an enlarged scale, of the rotor disc of the lubricant and fuel mixing device.

In the form of the invention illustrated 1 indicates the shaft of the rotor of a supercharger of the eccentric drum type. The shaft 1 drives, through bevel gears 2 and 3, a shaft 4 rotatably mounted in a casing 5 and carrying thereon a worm 6 meshing with two worm wheels 7 and 8. The upper worm wheel 7 is mounted on a shaft 9 having crank pins 10 disposed 180 degrees apart and operating respectively two pumps 7' and 7". The pump 7' delivers lubricant to the supercharger and the pump 7" delivers lubricant to a mixer hereinafter described.

The two pumps are identical in construction, one being shown in section in Figure 2 and consisting of a guide sleeve 11 having in its upper portion a sliding bush 12 to receive a crank pin 10, the said bush reciprocating in a direction at right angles to the vertical axis of the guide sleeve 11 as the shaft 9 and pin 10 rotate to reciprocate the guide sleeve. This sleeve is mounted to travel over a fixed pump cylinder 14 within which operates a pump plunger 15 fixed within the guide sleeve 11 by means of a pin 16. When the plunger 15 of the pump 7' is at the top of its suction stroke, as shown in Figure 2, the plunger in the opposite pump 7" is at the bottom or end of its delivery stroke. Lubricating oil is supplied through an inlet 13 to the interior of the casing 5 within which the worm 6 and worm wheels 7 and 8 are located. Any suitable means, not shown, may be used to supply lubricating oil to the interior of the casing 5 through the port 13.

A horizontally disposed valve stem 20, to which the lower worm gear 8 is fixed, is rotatable in a chamber 20' formed in the lower part of the casing 5 below the pumps 7' and 7". The valve stem 20 is provided with annular grooves 21 and 22, near its ends and outwardly of the grooves with peripheral recesses 23 and 24. The groove 21 communicates with the inner end of the recess 23 and by way of a passage 18 with the lower end of the cylinder of the pump 7'. The groove 22 communicates with the inner end of the recess 24, and by way of a passage 19 with the lower end of the cylinder of the pump 7". Passages 18' and 19', formed in the lower part of the casing 5, at opposite sides of the chamber 20', extend in opposite directions from the interior of the casing to points near the outer ends of the chamber 20'. The passages 18' and 19' communicate with opposite sides of the chamber 20' at points adapted to register with the recesses 23 and 24, respectively. A passage 25 formed in the lower part of the casing 5, communicates at one end with the chamber 20' at a point directly opposite the point at which the passage 18' communicates with the valve chamber. A conduit 26 extends from the other end of the passage 25 to a hollow space 27 within the rotor shaft 1 of the supercharger. A passage 28 formed in the lower part of the casing 5, communicates at one end with the chamber 20' at a point directly opposite the point at which the passage 19' communicates with the valve chamber. The passage 28 communicates at its other end with a passage 29 which is also formed in the casing 5, and which communicates with one end of a passage 30 formed in the casing 31 of a device 31' for mixing the lubricating oil and liquid fuel. The other end of the passage 30 communicates with an annular passage 32 formed in the mixer casing 31 around the shaft 4. A passage 43, formed in the shaft 4, communicates with the passage 32 and with passages 44 and 38 formed in a mixer disc 34 fixed to the shaft 4 and located in the mixing chamber 35 of the mixing device 31'.

During the rotation of the valve stem 20, the recess 23 in the valve stem alternately registers with the opposed ends of the passages 18' and 25, and the recess 24 in the valve stem alternately registers with the opposed ends of the passages 19' and 28. The recess 23 registers with the passage 18' during the suction stroke of the plunger of the pump 7', and this recess registers with the passage 25 during the delivery stroke of the plunger of the pump 7'. The recess 24 registers with the passage 19' during the suction stroke of the plunger of the pump 7'', and this recess registers with the passage 28 during the delivery stroke of the plunger of the pump 7''. It will thus be seen that the pumps 7' and 7'' are in communication with the interior of the casing 5 during the suction strokes of their plungers, that the pump 7' is in communication with the hollow space 27 of the shaft 1 during the delivery stroke of its plunger, and that the pump 7'' is in communication with the passages 44 and 38 of the mixer disc 34 during the delivery stroke of its plunger. The pump 7' draws lubricating oil from the interior of the casing 5 through the passage 18', recess 23, groove 21 and passage 18, and delivers the oil to the hollow space 27 of the shaft 1 through the passage 18, groove 21, recess 23, passage 25 and conduit 26. The lubricating oil is distributed from the hollow space 27 of the shaft 1 in any usual manner to the various parts of the supercharger mechanism. The pump 7'' draws oil from the interior of the casing 5 through the passage 19', recess 24, groove 22 and passage 19, and delivers the oil to the passages 44 and 38 of the mixer disc 34 through the passage 19, groove 22, recess 24, and passages 28, 29, 30, 32 and 43. The shaft 4 extends through a gland 33 arranged between the casing 5 and the mixer casing 31.

The apparatus also includes means for altering the timing of the valve for the pump 7'', which valve includes the stem 20, and the groove 22 and recess 24 in the stem. The timing means includes a sleeve 40 which is rotatably mounted on that end of the stem 20 which is provided with the groove 22 and the recess 24. The sleeve 40 is provided with diametrically opposed ports 41 for adjustment with relation to the passage 19 and diametrically opposed ports 41' for adjustment with relation to the passages 19' and 28. The ports 41 and 41' are arranged in radially displaced relation. The sleeve 40 is fixed to a shaft 40' which is rotatably mounted, as at 40'', in the casing 5, and which is adapted to be connected with the throttle control means of the supercharger for operation thereby. The movement of the sleeve 40 by the throttle control means alters the positions of the ports 41 and 41' with relation to the passages 19, 19' and 28 to vary the amount of oil delivered to the mixer in accordance with requirements as controlled by the position of the throttle of the supercharger.

The mixer rotor disc 34 is rotatable in the mixing chamber 35 which has a fuel inlet 36 and an outlet 37 through which latter the mixture of fuel and oil passes to the carburettor, the front of the mixing chamber being preferably provided with a transparent wall 38'.

The mixer rotor disc 34 is shown in detail in Figure 4 and has a central oil distribution chamber 42 communicating with the supply passage 32 by a passage 43 passing through the shaft 4. From the chamber 42 extend the radial passages 44 connected at their outer ends by the passages 38 whose points of intersection provide ports 39 located in the periphery of the disc 34 and communicating with the interior of the mixing chamber 35. With this arrangement and assuming the disc 34 to be rotated in an anti-clockwise direction, Figure 4, the lubricant will be distributed centrifugally through the radial passages 44 to mix with the liquid fuel which is forced into the passages 38 by the rotation of the disc in the liquid fuel in the mixing chamber 35, the mixture of lubricant and fuel passing in the direction of the arrows to the ports 39.

It is to be understood that the invention is not restricted to the lubrication of a supercharger as the pump 11 may be utilized to lubricate other mechanism instead of or in addition to the supercharger whilst the shaft 4 may be rotated from any rotary part of the engine mechanism.

I claim:—

1. Means for forming a fuel and lubricant mixture for an internal combustion engine, comprising a mixing chamber having an inlet for the admission of fuel and an outlet for the discharge of fuel, a container for the lubricant, a pump for delivering lubricant from said container, mechanical means within said chamber for receiving the lubricant from said pump and mixing the lubricant with the fuel in said chamber, and means for operating said pump and mixing means.

2. Means for forming a fuel and lubricant mixture for an internal combustion engine, comprising a mixing chamber having an inlet for the admission of fuel and an outlet for the discharge of fuel, a container for the lubricant, a pump for delivering lubricant from said container, mechanical means within said chamber for receiving the lubricant from said pump and mixing the lubricant with the fuel in said chamber, a second pump, said second pump serving to deliver lubricant from said container to the working parts of the engine or the like, operating means for both of said pumps and said mixing means, and common controlling valve means for the pumps driven from said operating means.

3. Means for forming a fuel and lubricant mixture for an internal combustion engine according to claim 1, wherein the pump for delivering lubricant from its container to the mixing means comprises a cylinder in communication with said container and said mixing means and a plunger slidable in said cylinder, and wherein the means for operating said pump comprises a shaft journaled in said container and having a crank pin connected to said plunger, a drive shaft journaled in said container, and meshing gears fixed to said shafts within said container.

4. Means for forming a fuel and lubricant mixture for an internal combustion engine according to claim 1, wherein the mixing means comprises a rotatable disc located in said chamber, said disc receiving the lubricant from the pump and mixing the lubricant with the fuel in said chamber by centrifugal action.

5. Means for forming a fuel and lubricant mixture for an internal combustion engine according to claim 1, wherein the mixing means comprises a rotatable disc located in said chamber, said disc having ports in its periphery, radial passages receiving the lubricant from the pump, and other passages angularly related to and communicating with said radial passages and communicating with said ports.

6. Means for forming a fuel and lubricant mixture for an internal combustion engine according to claim 1, comprising means for varying the amount of lubricant delivered by the pump from the container to the mixing means.

7. Means for forming a fuel and lubricant mixture for an internal combustion engine, comprising a mixing chamber having an inlet for the admission of fuel and an outlet for the discharge of fuel, a container for the lubricant, a pump for delivering lubricant from said container, mechanical means within said chamber for receiving the lubricant from said pump and mixing the lubricant with the fuel in said chamber, a valve operable to alternately establish communication between said pump and container and between said pump and mixing means, a shaft carrying a gear and connected to said pump, a gear connected to said valve, a drive shaft carrying and operating said mixing means, and gear means driven by said drive shaft enmeshed with said first and second mentioned gears.

8. Means for forming a fuel and lubricant mixture for an internal combustion engine, comprising a mixing chamber having an inlet for the admission of fuel and an outlet for the discharge of fuel, a container for the lubricant, a pump for delivering lubricant from said container, mechanical means within said chamber for receiving the lubricant from said pump and mixing the lubricant with the fuel in said chamber, a second pump, said second pump serving to deliver lubricant from said container to the working parts of said engine or the like, each of said pumps comprising a cylinder and a plunger operable in the cylinder, a shaft having crank pins connected to said plungers, a drive shaft carrying and operating said mechanical means, gearing to drive said first shaft from the drive shaft, and a common controlling valve means for both pumps driven from the drive shaft.

9. Means for forming a fuel and lubricant mixture for an internal combustion engine, comprising a mixing chamber having an inlet for the admission of fuel and an outlet for the discharge of fuel, a container for the lubricant, a pump for delivering lubricant from said container, mechanical means within said chamber for receiving the lubricant from said pump and mixing the lubricant with the fuel in said chamber, a rotary valve operable to alternately establish communication between said pump and container and between said pump and mixing means, a second pump, said second pump serving to deliver lubricant from said container to operating parts of said engine or the like, said rotary valve also controlling the discharge from said second pump, common power operated means operating said pumps, and means for rotating said mixing means and valve.

10. Means for forming a fuel and lubricant mixture for an internal combustion engine, comprising a mixing chamber having an inlet for the admission of fuel and an outlet for the discharge of fuel, a container for the lubricant, a pump for delivering lubricant from said container, mechanical means within said chamber for receiving the lubricant from said pump and mixing the lubricant with the fuel in said chamber, a rotary valve operable to alternately establish communication between said pump and container and between said pump and mixing means, a second pump, said second pump serving to deliver lubricant from said container to operating parts of said engine or the like, said rotary valve also controlling the inlet to and discharge from the second pump, and means for operating said pumps, mixing means and valve.

JOSEPH LAMBERT JAMESON.